Patented June 13, 1939

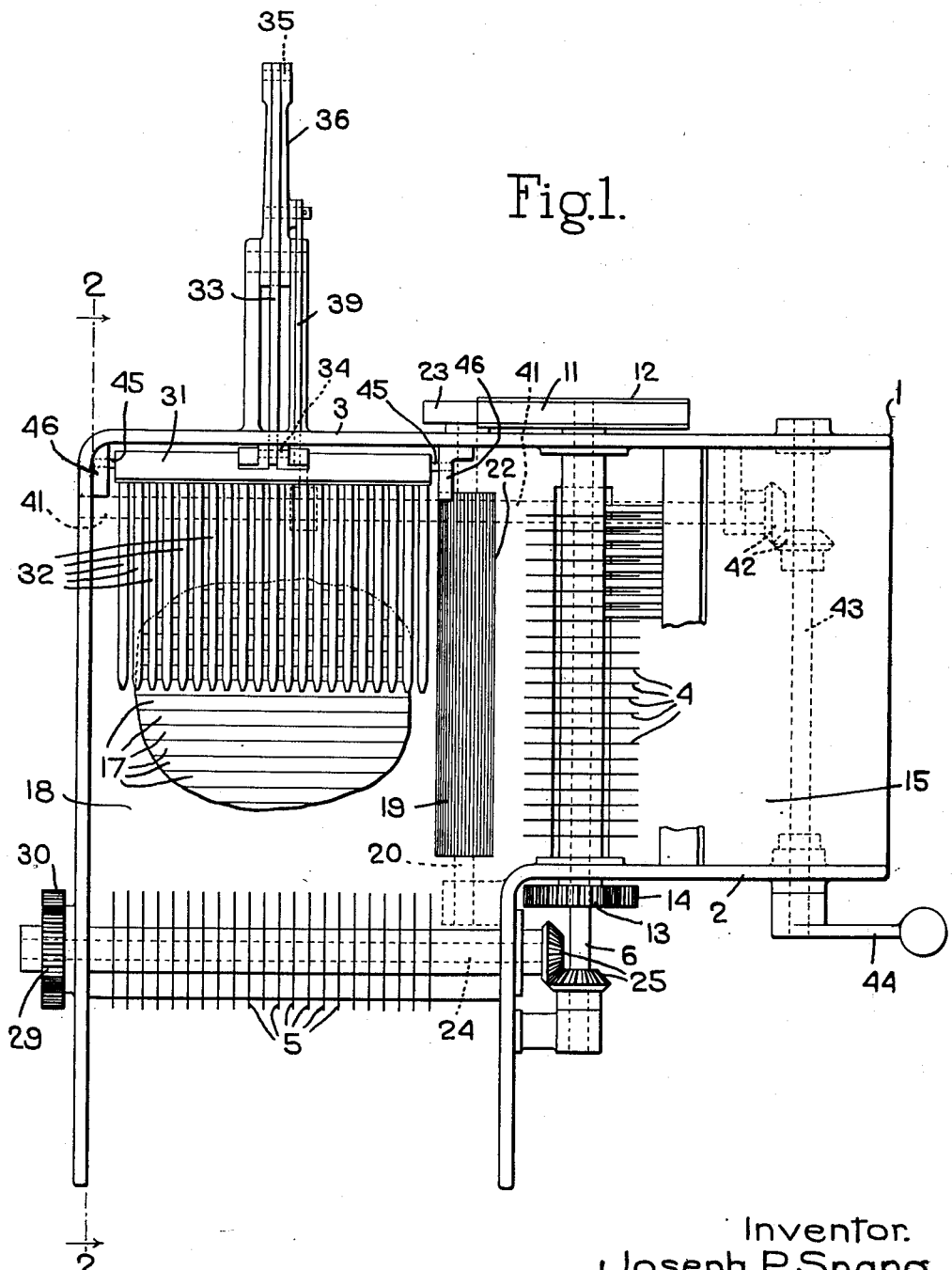

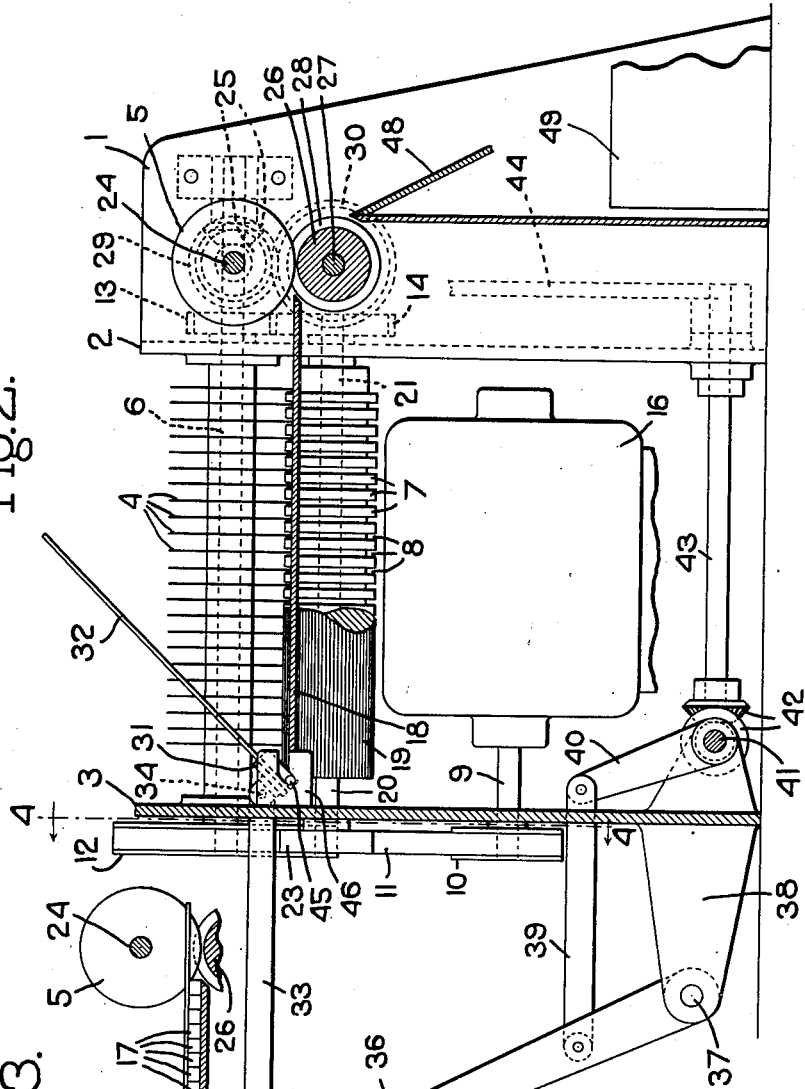
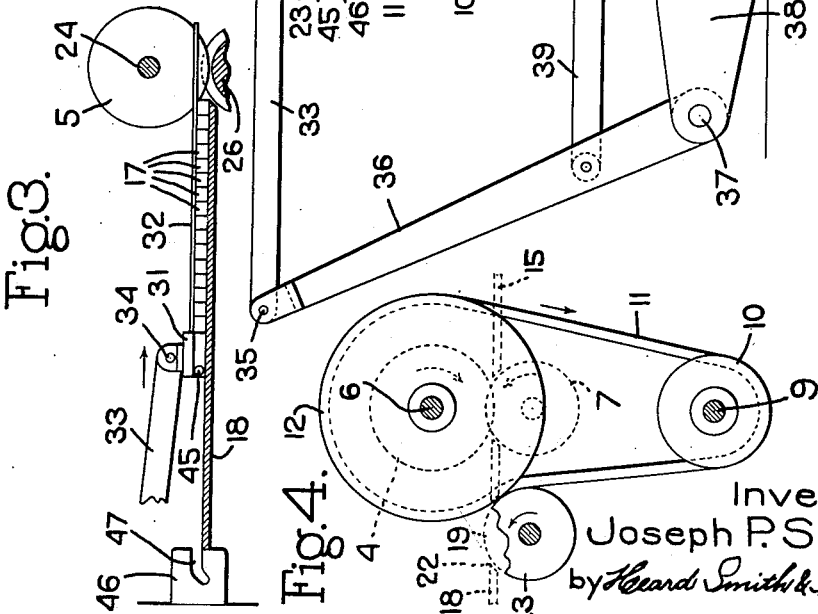
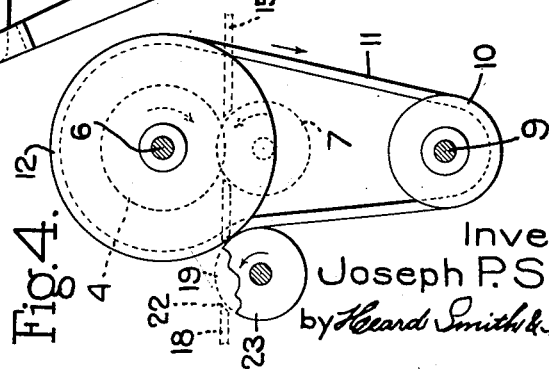

2,161,891

UNITED STATES PATENT OFFICE 2,161,891

MACHINE FOR DICING VEGETABLES, FRUIT, MEAT, ETC.

Joseph P. Spang, Quincy, Mass.

Original application March 26, 1937, Serial No. 133,173. Divided and this application December 29, 1937, Serial No. 182,229

5 Claims. (Cl. 146—78)

This invention relates to a machine designed for dicing vegetables, fruit, meat and other food products, and it comprises two sets of rotary cutting knives, the axis of rotation of one set of knives being at right angles to that of the other set of knives, one set of knives operating to cut a slice into strips and the other set operating to cut the strips into cubes.

One feature of the present invention relates to a novel means for handling the strips after they have been delivered from the first set of knives so as to deliver them properly to the knives of the second set to be cut into cubes.

Other features of the invention relate to improvements in dicing machines having two sets of rotary cutting knives which will be more fully hereinafter set forth and then pointed out in the appended claims.

In the drawings wherein I have illustrated a selected embodiment of the invention;

Fig. 1 is a top plan view of a machine embodying my invention;

Fig. 2 is a section on the line 2—2, Fig. 1;

Fig. 3 is a fragmentary sectional view showing the operation of the combined hold-down and pusher employed for feeding the strips to the knives of the second set;

Fig. 4 is a section on the line 4—4, Fig. 2.

As stated above my improved machine comprises two sets of rotary knives which are mounted in a suitable frame so that the axis of rotation of one set is at substantially right angles to that of the other set. In the drawings I indicates generally a suitable frame having the two angular side members 2 and 3 in which the knives are journalled. 4 indicates the rotary knives of one set and 5 indicates the rotary knives of the other set. The knives 4 are mounted on a knife shaft 6 which is suitably journalled in the sides 2 and 3 of the frame 1. Cooperating with these knives 4 is a feed roll 7 mounted on a shaft 21 which is also journalled in the sides 2 and 3 of the frame and which is provided with peripheral grooves 8 in which the edges of the knives 4 are received. The knife shaft 6 is shown as being driven by a suitable motor 16, the shaft 9 of which carries a driving pulley 10 which is connected by a belt 11 to a pulley 12 on the knife shaft 6. Said knife shaft 6 and the shaft 21 of the feed roll 7 are connected by intermeshing gears 13, 14. 15 indicates a platform on which the slice to be diced may be placed and from which it is fed to the knives 4 and feed roll 7. As this slice passes over the feed roll 7 it is cut into strips 17 by the knives 4 and these strips are delivered onto a receiving platform 18 as illustrated in Fig. 1.

In order to provide for delivering the strips 17 free from and clear of the knives 4 I propose to employ an additional fluted feed roller 19 which is mounted on a shaft 20 journalled in the frame and is positively driven by the belt 11. The receiving platform 15 is cut away as shown at 22 to receive the additional feed roll 46 so that the surface of the latter extends slightly above the receiving platform. The shaft 20 of the feed roll 19 has a pulley 23 thereon which is engaged by the outside of the belt 11 as shown in Fig. 4 so that the belt 11 not only drives the knife shaft 6 but also rotates the additional feed roll 19.

The rotary knives 5 that cut the strips into cubes are carried by a suitable shaft 24 journalled in the sides 2 and 3 of the frame and which extends at right angles to the shaft 6. The knife shafts 6 and 24 are geared together by suitable beveled gearing 25. A feed roll 26 carried by a shaft 27 cooperates with the knives 5, said feed roll 26 having a plurality of peripheral grooves 28 in which the knives 5 operate. The feed roll 26 is connected to and driven by the knife shaft 24 through the medium of suitable intermeshing gears 29, 30.

In order to feed the strips 17 to the second set of knives there is provided a combined pusher and hold-down which serves to push the strips 17 sidewise over the platform 18 and deliver them successively to the knives 5. This combined hold-down and pusher is in the form of a head or pusher bar 31 which extends substantially the width of the receiving platform 18 and is adapted to be moved over the platform toward the knives 5 thereby to push the strips 17 into position to be acted on by said knives. This pusher bar 31 is provided with a series of hold-down fingers 32 which rest on the top of the strips 17 and thus hold the strips in position, and which are situated so that as the pusher bar moves forwardly to feed the strips to the knives 5 said fingers pass between the knives.

The pusher head or bar 31 is a rocking bar and when it is in its retracted position it is rocked upwardly so as to bring the hold-down fingers 32 into an elevated position shown in Fig. 2. This is the position of the parts when the slice is being fed through the first set of knives 4. The raised position of the hold-down fingers 32 allows the strips 17 to be delivered onto the platform 18 beneath the fingers. When the strips 17 have been received on the platform 18 as shown in Fig. 1 then the pusher bar is actuated to feed the strips to the knives 5. The initial movement of the pusher is a rocking movement to bring the fingers 32 downwardly onto the strips 17 of material, and the further movement is a sliding movement over the platform 18 by which the strips are pushed forwardly and delivered successively to the knives 5 which operate to cut the strips into cubes. I have provided herein manual means for operating this pusher bar although it would be within the invention to employ power-driven means for this purpose if desired.

As herein shown the pusher bar has a link 33 pivotally connected thereto at 34, and the outer end of this link is pivoted at 35 to a lever 36 which in turn is pivoted at 37 to a bracket 38 with which the frame 1 is provided. The lever 36 is connected by a link 39 to an arm 40 fast on a rock shaft 41 which is journalled in suitable bearings carried by the frame. This rock shaft 41 is connected by beveled gears 42 to another rock shaft 43 also suitably journalled in the frame, and the rock shaft 43 is provided with a handle or treadle 44 by which it may be oscillated  The pusher bar 31 is provided at each end with a trunnion 45 situated below the point 34 at which the link 33 is pivoted to the pusher bar. The frame 1 is provided with two brackets 46, each having an open-ended curved slot 47, these slots being so disposed that when the pusher bar approaches the end of its backward movement the trunnions 45 will enter the slots 47, and as the backward movement is completed the trunnions pass into the curved portions of the slots and the backward pulling force of the link 33 on the pivotal point 34 serves to rock the pusher bar about the trunnions and move the fingers 32 into their elevated position shown in Fig. 2.

In using this embodiment of the invention and assuming that the pusher bar 31 and fingers 32 are in the position shown in Fig. 2, the operator places a slice of material to be cubed on the platform 15 and feeds it forward until it is engaged by the feed roll 7 and knives 4. The action of the feed roll and knives on the slice feeds it past the knives onto the platform 18 and the feed roll 19 serves to assist this feeding movement and to deliver the strips onto the platform free from and clear of the knives 4 as shown in Fig. 1. The operator then actuates the arm 44 to move the link 33 forward, and, as stated above, the initial movement of the link 33 serves to rock the pusher bar 31 and lower the fingers 32 onto the strips 17, and the continued forward movement of the link 33 brings the pusher bar 31 into engagement with the strips 17 and pushes them forward into position to be acted on by the knives 5 which operate to cut the strips into cubes.

48 indicates a chute situated on the delivery side of the knives 5 and onto which the cubed material is deposited from the knives. This chute is adapted to convey the cubes into a suitable container 49.

After the strips 17 have been fed to the knives 5 by the pusher 31 and its hold-down fingers 32, the operator will return the handle 44 to its normal position thereby returning the pusher bar 31 to its initial position with the hold-down fingers 32 raised as shown in Fig 2. The machine is then ready to have another slice of vegetable or meat, etc. delivered to the platform 15 and fed to the knives 4.

This application is a division of my co-pending application, Serial No. 133,173, filed March 26, 1937.

I claim:

1. A machine for dicing vegetables and meat comprising a feed roll having peripheral grooves, a set of rotary knives dipping into said grooves, a second feed roll also having peripheral grooves, a second set of rotary knives dipping into said grooves, said latter second feed roll and second set of knives being situated at right angles to the first feed roll and first set of knives, means to rotate the feed rolls and knives, a platform to receive material from the first set of knives which material then is in strip form with the strips extending parallel to the axis of the second set of knives, a combined pusher and hold-down movable over the platform toward and from the second set of knives, means to actuate said pusher and hold-down to feed the material in strip form from the platform to the second feed roll and knives with the strips extending parallel to the axes of the knives and to hold the material on the platform as it is fed thereover, and means operating automatically to raise the hold-down from the platform as the pusher reaches the end of its backward stroke and to automatically lower the hold-down onto the material as the pusher starts its forward stroke.

2. A machine for cutting vegetables and meat comprising a feed roll having peripheral grooves, a set of rotary knives dipping into said grooves, a platform for supporting the material as it is fed to the knives, a rocking pusher movable over said platform for feeding the material to the knives, hold-down fingers extending from and carried by said pusher, means to reciprocate the pusher toward and from the knives and means rendered operative by the final backward movement of the pusher to rock the latter in a direction to raise the fingers from the platform, said means being operative during the initial forward movement of the pusher to rock the latter in a direction to close the fingers onto the material resting on the platform.

3. A machine for dicing vegetables and meat comprising a set of rotary knives adapted to cut into strips a slice which is fed thereto, a second set of rotary knives rotating about an axis at right angles to that of the first set of knives, means to rotate the knives of both sets, a platform to receive the material from the first set of knives, which material is then in strip form with the strips extending parallel to the axis of the second set of knives, a combined pusher and hold-down movable over the platform toward and from the second set of knives, said pusher and hold-down having trunnion pins at its ends, means to move the combined pusher and hold-down toward the second set of knives to feed the material in strip form over said platform to the second set of knives and then to return the combined pusher and hold-down to initial position, and brackets having curved slots into which the trunnion pins enter during the final backward movement of the pusher whereby the pusher is rocked to raise the hold-down from the platform.

4 A machine for dicing vegetables and meat comprising a set of rotary knives adapted to cut into strips a slice which is fed thereto, a second set of rotary knives rotating about an axis at right angles to that of the first set of knives, means to rotate the knives of both sets, a platform to receive the material from the first set of knives, which material is then in strip form, a pusher movable over the platform toward and from the second set of knives, said pusher and hold-down having hold-down fingers extending therefrom and having trunnion pins at its ends, pusher-actuating means connected to the pusher at a point above the trunnion pins and by which the pusher and hold-down is given its reciprocatory movement, and brackets having curved slots situated to receive the trunnion pins during the final backward movement of the pusher, the relation between the point at which the pusher-actuating means applies its pusher-moving force to the pusher and the trunnion pins being such that the pusher is rocked during the final portion of its backward movement thereby to raise the fingers from the platform, and is rocked in the opposite direction during the initial forward movement thereby to lower the fingers onto the material.

5. A machine for dicing vegetables and meat comprising a set of rotary knives adapted to cut into strips a slice which is fed thereto, a second set of rotary knives rotating about an axis at right angles to that of the first set of knives, means to rotate the knives of both sets, a platform situated to receive the material from the first set of knives, a feed roll adapted to engage the material as it is delivered from the first set of knives and assist in carrying said material onto the platform, a combined pusher and hold-down movable over the platform toward and from the second set of knives to feed the material in strip form to the knives of the second set, means to reciprocate the pusher and hold-down and means to automatically raise the hold-down from the platform when it reaches the end of its backward stroke and to lower the hold-down onto the material as it starts its forward stroke.

JOSEPH P. SPANG.